United States Patent [19]

Saito et al.

[11] Patent Number: 5,037,868

[45] Date of Patent: Aug. 6, 1991

[54] VULCANIZABLE RUBBER COMPOSITION

[75] Inventors: Masayuki Saito; Mitsuo Hamada, both of Chiba, Japan

[73] Assignee: Toray Silicone Company, LTD., Tokyo, Japan

[21] Appl. No.: 284,045

[22] Filed: Dec. 14, 1988

[30] Foreign Application Priority Data

Dec. 14, 1987 [JP]  Japan ................. 62-315857

[51] Int. Cl.$^5$ ............. C08K 5/3445; C08L 83/07
[52] U.S. Cl. .................... 524/93; 524/188; 524/432; 525/101; 525/106; 525/477; 525/479
[58] Field of Search ............ 525/105, 106, 288, 477, 525/479, 101; 524/188, 506, 432, 93; 523/203, 217

[56] References Cited

U.S. PATENT DOCUMENTS

| | | | |
|---|---|---|---|
| 3,586,652 | 6/1971 | Hamed | 525/105 |
| 3,959,533 | 5/1976 | Kitaj | 525/106 |
| 4,151,154 | 4/1976 | Berger | 523/203 |
| 4,201,698 | 5/1980 | Itoh et al. | 525/106 |
| 4,376,184 | 3/1983 | Itoh et al. | 525/106 |
| 4,707,505 | 11/1987 | Matsuno et al. | 523/203 |
| 4,714,733 | 12/1987 | Itoh et al. | 524/493 |

FOREIGN PATENT DOCUMENTS 55-071737  5/1980  Japan.

OTHER PUBLICATIONS

*The Vanderbilt Rubber Handbook*, R. T. Vanderbilt Company, New York, N.Y., 1958.

*Primary Examiner*—Melvyn I. Marquis
*Assistant Examiner*—R. Dean, Jr.
*Attorney, Agent, or Firm*—Roger H. Borrousch

[57] ABSTRACT

A vulcanizable ethylene-propylene rubber composition with improved thermal aging resistance is made from ethylene-propylene rubber, an alkoxysilane such as N-(N-vinylbenzylaminoethyl)-gamma-aminopropyltrimethoxysilane or its hydrochloride, a reinforcing filler, and a vulcanizing agent. These vulcanizable ethylene-propylene rubber compositions can also contain vinyl group-containing organopolysiloxane gum. These compositions cure to rubber with excellent mechanical properties, excellent electrical insulation properties, and thermal aging resistance which makes them suitable for electrical wire insulation.

7 Claims, No Drawings

VULCANIZABLE RUBBER COMPOSITION

BACKGROUND OF THE INVENTION

1. Technical Field

The present invention relates to a vulcanizable ethylene-propylene rubber composition.

2. Background Information

Ethylene-propylene rubbers have excellent mechanical properties and electrical insulating properties, and as a consequence are well-suited for use in automobile parts, components for electrical instruments and devices, etc. However, this type of rubber also has a low resistance to thermal aging, which places limitations on its use. Recent attempts at improving the thermal aging resistance have involved the addition of aging inhibitors to this type of rubber, but the results in this regard have not been entirely satisfactory.

SUMMARY OF THE INVENTION

The present inventors, as the result of extensive research aimed at solving the above problem, found that the thermal aging resistance can be substantially improved, without comprising the mechanical properties or electrical insulating properties, by the addition of a specific alkoxysilane to ethylene-propylene rubbers. The present invention was achieved based on this finding.

Thus, the object of the present invention is a vulcanizable ethylene-propylene rubber composition which can be heat-cured to give a rubber which itself has excellent mechanical properties, excellent electrical insulating properties, and an excellent resistance to thermal aging.

The present invention relates to a vulcanizable rubber composition comprising (A) 100 parts by weight ethylene-propylene rubber, (B) 0.1 to 10 parts by weight of an alkoxysilane with the general formula

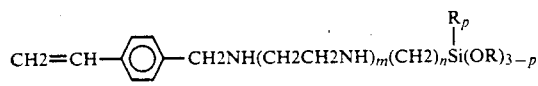

in the formula, m is zero or 1, n is 1 to 4, p is zero or 1, and R is a lower alkyl group, or hydrochloride of the alkoxysilane, (C) 10 to 150 parts by weight reinforcing filler, and (D) vulcanizing agent in a quantity sufficient for the vulcanization of component (A).

DESCRIPTION OF THE PREFERRED EMBODIMENTS

To explain the invention in greater detail, the ethylene-propylene rubber, component (A), is an ethylene-propylene copolymer, such as ethylene-propylene copolymers (EPM), ethylene-propylene-nonconjugated diene terpolymers (EPDM), etc., and its composition is not specifically restricted. A number of ethylene-propylene rubbers are available commercially: refer in this regard to, "The Industrial Technology of Synthetic Rubbers. Number 7. Ethylene-Propylene Rubbers," published July 10, 1972 by Kabushiki Kaisha Taisei-sha. However, from among the preceding, those having a Mooney viscosity [$ML_{1+4}$] within the range of 3 to 180 and in particular within the range of 6 to 120, in each case at 100 degrees Centigrade, are preferred in the present invention for their excellent mechanical properties and good molding processability.

The alkoxysilane, component (B), is the essential component which imparts thermal aging resistance to the vulcanizable rubber composition of the present invention. This component is an alkoxysilane with the following general formula

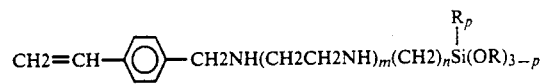

in the preceding formula, m = zero or one, n is 1 through 4, p is zero or one, and R is a lower alkyl group) and hydrochlorides thereof.

This alkoxysilane is exemplified by N-beta-(N-vinylbenzylaminoethyl)-gamma-aminopropyltrimethoxysilane, N-beta-(N-vinylbenzylaminoethyl)-gamma-aminopropyltrimethoxysilane, N-beta-(N-vinylbenzylaminoethyl)-gamma-aminopropylmethyldimethoxysilane, N-beta-(N-vinylbenzylaminoethyl)-gamma-aminopropyltriethoxysilane, N-beta-(N-vinylbenzylaminoethyl)-gamma-aminopropyltriethoxysilane, N-beta-(N-vinylbenzylaminoethyl)-gamma-aminopropylmethyldiethoxysilane, N-vinylbenzyl-gamma-aminopropyltrimethoxysilane, and the hydrochlorides of these alkoxysilanes.

Methods for the preparation of such alkoxysilanes are in fact well known, for example, they are readily obtained by a reaction between an amino-substituted alkylalkoxysilane and vinylbenzyl chloride.

Component (B) is added within the range of 0.1 to 10 parts by weight per 100 parts by weight component (A). The desired thermal aging resistance cannot be obtained at below 0.1 part by weight, while exceeding 10 parts by weight parts impairs the processability.

The reinforcing filler, component (C), functions to impart mechanical strength to the vulcanizable rubber composition of the present invention. In general, it will be possible to use the various fillers known for use as rubber-reinforcing fillers. Examples of these reinforcing fillers are dry-method white carbon, wet-method white carbon, calcium carbonate, clay, talc, and carbon black.

Component (C) is added within the range of 10 to 150 parts by weight, preferably within the range of 20 to 100 parts by weight per 100 parts by weight component (A).

No particular restriction is placed on the vulcanizing agent of component (D), as long as, it can bring about the vulcanization of component (A); however, organoperoxides and sulfur compounds are typically used in this regard. While the organoperoxides are generally exemplified by dicumyl peroxide, 2,5-dimethyl-2,5-(tert-butylperoxy)hexane, 2,5-dimethyl-2,5-di(benzoylperoxy)hexane, 2,5-dimethyl-2,5-di(tert-butylperoxy)-hex-3-yne, di-tert-butyl peroxide, di-tert-butylperoxy-3,3,5-trimethylcyclohexane, and tert-butyl hydroperoxide, the use of dicumyl peroxide, di-tert-butyl peroxide, or di-tert-butylperoxy-3,3,5-trimethylcyclohexane from among the preceding is preferred. The addition of this component should be sufficient to vulcanize component (A), and generally falls within the range of 0.1 to 15 parts by weight per 100 parts by weight of component (A). Usable sulfur compounds in general are sulfur, sulfur chloride, sulfur dichloride, morpholine disulfide, alkylphenol disulfide, and tetramethylthiuram disulfide, and sulfur is preferred among these. The addition of this component again should be sufficient to vulcanize component (A), and generally falls within the range of 0.1 to 10 parts by weight per 100 parts by weight of component (A). While these vulcanizing agents can be used by themselves, it is preferred that they be used in combination with vulcanization assistants. Vulcanization assistants which can be used when the vulcanizing agent is an organoperoxide are, for example, sulfur, quinonedioximes such as para-quinonedioxime, etc., methacrylates such as polyethylene glycol dimethylacrylate, etc., diallyl phthalate, triallyl cyanurate, and divinylbenzene.

Vulcanization assistants which can be used when the vulcanizing agent is a sulfur compound are, for example, thiazoles such as
 N-cyclohexyl-2-benzothiazolesulfenamide,
 N-oxydiethylene-2-benzothiazolesulfenamide,
 2-mercaptobenzothiazole,
 2-(2,4-dinitrophenyl)mercaptobenzothiazole,
 2-(2,6-diethyl-4-morpholinothio)benzothiazole,
 dibenzothiazyl disulfide, etc.;
guanidines such as
 diphenylguanidine,
 triphenylguanidine,
 di-ortho-tolylguanidine,
 diphenylguanidine phthalate, etc.;
aldehyde-amines and aldehyde-ammonias such as
 acetaldehyde-aniline reaction products,
 butyraldehyde-aniline condensates,
 hexamethylenetetramine,
 acetaldehyde ammonia, etc.;
imidazolines such as
 2-mercaptoimidazoline, etc.;
thioureas such as
 thiocarbanilide,
 diethylthiourea,
 dibutylthiourea,
 trimethylthiourea,
 di-ortho-tolylthiourea, etc.;
thiurams such as
 tetramethylthiuram monosulfide,
 tetramethylthiuram disulfide,
 tetraethylthiuram disulfide, etc.;
dithioate salts such as
 zinc dimethyldithiocarbamate,
 zinc diethyldithiocarbamate,
 zinc ethylphenyldithiocarbamate,
 zinc butylphenyldithiocarbamate,
 sodium dimethyldithiocarbamate,
 selenium dimethyldithiocarbamate,
 selenium diethyldithiocarbamate,
 tellurium diethyldithiocarbamate, etc.;
xanthates such as
 zinc dibutylxanthate, etc.; and
zinc oxide.

Within the present invention, one will find it advantageous to add an organopolysiloxane gum, component (E), in addition to the above components (A) through (D), in order to improve the processing properties of the uncured vulcanizable rubber composition of the present invention, as well as, to improve the thermal aging resistance of the rubber after curing. The organic groups on the organopolysiloxane in this context are exemplified by alkyl groups such as methyl, ethyl, propyl, etc.; alkenyl groups such as vinyl, allyl, etc.; and aryl groups such as phenyl, etc. Examples of the organopolysiloxane gum itself are as follows:
 dimethylvinylsiloxy-terminated dimethylsiloxanemethylvinylsiloxane copolymer gums,
 dimethylvinylsiloxy-terminated dimethylpolysiloxane gums,
 dimethylvinylsiloxy-terminated dimethylsiloxanemethylphenylsiloxane copolymer gums,
 trimethylsiloxy-terminated dimethylsiloxanemethylvinylsiloxane copolymer gums, and
 trimethylsiloxy-terminated dimethylsiloxanemethylphenylsiloxane copolymer gums. Preferred among these are organopolysiloxane gums which have at least 2 vinyl groups in each molecule.

Component (E) is to be added within the range of 0.1 to 150 parts by weight per 100 parts by weight component (A).

In addition to the aforementioned components (A) through (D), the addition of an ethylene-propylene rubber aging inhibitor will also be advantageous. This aging inhibitor may be any aging inhibitor known in the art for use with ethylene-propylene rubber systems, and no specific restriction applies. Examples of aging inhibitors in this regard are nickel dibutyldithiocarbamate, imidazole, thiazole, 2-mercaptobenzimidazole, tri(nonylphenyl) phosphite, and N,N'-diphenyl-p-phenylenediamine.

Furthermore, in addition to the aforementioned components (A) through (D), a softener for ethylene-propylene rubbers may also be added within the present invention. This softener corresponds to those softeners used for ethylene-propylene rubbers, and no specific restriction applies in this regard. Examples of such softeners are petroleum-based softeners such as process oils, lubricating oils, synthetic lubricating oils, paraffins, liquid paraffins, petroleum asphalts, vaseline, etc.; coal tar-based softeners such as coal tar, coal tar pitch, etc.; fatty oil softeners such as castor oil, linseed oil, rapeseed oil, coconut oil, etc.; waxes such as tall oil, factice, beeswax, carnauba wax, lanolin, etc.; fatty acids and fatty acid salts such as ricinoleic acid, palmitic acid, barium stearate, calcium stearate, zinc laurate, etc.; synthetic macromolecular substances such as petroleum resins, atactic polypropylene, coumarone-indene resins, polyester resins, silicone resins such as organopolysiloxanes and the like, etc.; ester-type plasticizers such as dioctyl adipate, dioctyl phthalate, etc.; and others such as microcrystalline wax.

The vulcanizable rubber composition of the present invention can be easily prepared by mixing the aforementioned components (A) through (D) or components (A) through (E) to homogeneity. For example, the aforementioned components (A) through (D) or the aforementioned components (A) through (E) and the various optional additives are blended and then kneaded for 3 to 20 minutes at 80 to 170 degrees Centigrade using a Banbury mixer; the vulcanizing agent and vulcanization assistant are then added and blended using an open roll; and take off in bun or sheet form finally affords the vulcanizable rubber composition. With regard to the procedures for the vulcanization of the vulcanizable rubber composition of the present invention, the vulcanizable rubber composition prepared as above is formed into the intended configuration using, for example, an extrusion molder, calender roll, press, etc., and is then readily vulcanized by heating for 1 to 2 minutes at 150 to 270 degrees Centigrade.

Because the vulcanizable rubber composition of the present invention as described in the preceding has excellent mechanical properties, electrical insulation properties, and thermal aging resistance, it is well-suited for use as an electric wire coating material, inner tubing, belting, rubber roll, gasket, packing, and rubber hosing.

EXAMPLES

The present invention will be described below with reference to illustrative examples and should not be construed as limiting the invention which is described in the claims. Parts=parts by weight in the examples.

EXAMPLE 1

100 Parts ethylene-propylene-diene rubber (EPT-3045 from Mitsui Petrochemical Industries Limited), 40 parts wetmethod silica, and 2.0 parts of a 40 weight percent methanol solution of the hydrochloride of N-beta-(N-vinylbenzylaminoethyl)-gamma-aminopropyltrimethoxysilane (SZ6032 from Toray Silicone Company Limited) were introduced into a Banbury mixer and kneaded for 15 minutes at 100 to 120 degrees Centigrade. Using an open roll, 5.0 parts dicumyl peroxide (vulcanizing agent), 3.0 parts zinc oxide (vulcanization assistant), and 2.0 parts 2-mercaptobenzimidazole (aging inhibitor) were mixed into the above mixture to give a vulcanizable rubber composition.

This vulcanizable rubber composition was formed into a 2 mm-thick rubber sheet by press vulcanization for 10 minutes at 170 degrees Centigrade, followed by secondary vulcanization for 2 hours at 150 degrees Centigrade. The resulting rubber sheet was placed in an oven regulated at 180 degrees Centigrade and was thermally aged for 70 hours. The physical properties of the rubber sheet were measured both before and after thermal aging using the methods of JIS K-6301, and the results of these measurements are reported in Table 1.

For comparison, a vulcanizable rubber composition was prepared as above, but omitting the N-beta-(N-vinylbenzylaminoethyl)-gamma-aminopropyltrimethoxysilane hydrochloride. The physical properties of rubber sheet obtained from this vulcanizable rubber composition were also measured as above, and these results are reported in Table 1.

TABLE 1

| ITEM | PRESENT INVENTION | COMPARISON EXAMPLE |
|---|---|---|
| Before thermal aging | | |
| Tensile strength, kg/cm$^2$ | 110 | 130 |
| Elongation, % | 450 | 480 |
| Hardness (JIS), JIS A | 70 | 70 |
| After thermal aging | | |
| Tensile strength, kg/cm$^2$ | 98 | 91 |
| Elongation, % | 315 | 240 |
| Tensile strength retention, % | 89 | 70 |
| Elongation retention, % | 70 | 50 |

Notes:
Tensile strength retention = tensile strength after thermal aging/tensile strength before thermal aging
Elongation retention = elongation after thermal aging/elongation before thermal aging

EXAMPLE 2

100 Parts ethylene-propylene rubber (EPT-0045 from Mitsui Petrochemical Industries Limited), 40 parts wet-method silica, and 2.0 parts of a 40 weight percent methanol solution of N-beta-(N-vinylbenzylaminoethyl)-gamma-aminopropyltrimethoxysilane (SZ6032 from Toray Silicone Company Limited, neutralized with sodium methylate) were introduced into a Banbury mixer and kneaded for 15 minutes at 100 to 120 degrees Centigrade. 5.0 Parts dicumyl peroxide (vulcanizing agent), 3.0 parts zinc oxide (vulcanization assistant), and 2.0 parts 2-mercaptobenzimidazole (aging inhibitor) were then mixed into the obtained mixture to afford a vulcanizable rubber composition. The rubber properties of this vulcanizable rubber composition were measured as in Example 1, and these results are reported in Table 2.

TABLE 2

| ITEM | PRESENT INVENTION |
|---|---|
| Before thermal aging | |
| Tensile strength, kg/cm$^2$ | 105 |
| Elongation, % | 700 |
| Hardness (JIS), JIS A | 57 |
| After thermal aging | |
| Tensile strength, kg/cm$^2$ | 88 |
| Elongation, % | 548 |
| Tensile strength retention, % | 84 |
| Elongation retention, % | 78 |

EXAMPLE 3

100 Parts of the ethylene-propylene-diene rubber described in Example 1, 20 parts dimethylvinylsiloxy-terminated dimethylsiloxane-methylvinylsiloxane copolymer gum (vinyl group content=0.2%), 40 parts of wet-process silica and 2.0 parts of a 40 weight percent methanol solution of the hydrochloride of N-beta-(N-vinylbenzylamino-ethyl)-gamma-aminopropyltrimethoxysilane (SZ6032 from Toray Silicone Company Limited) were introduced into a Banbury mixer and kneaded for 15 minutes at 100 to 120 degrees Centigrade. Then, 5.0 parts dicumyl peroxide (vulcanizing agent), 3.0 parts zinc oxide (vulcanization assistant), and 2.0 parts 2-mercaptobenzimidazole (aging inhibitor) were mixed into the obtained mixture using an open roll to yield a vulcanizable rubber composition.

The rubber properties of this vulcanizable rubber composition were measured as in Example 1, and the results are reported in Table 3.

For comparison, a vulcanizable rubber composition was prepared as above, but omitting the N-beta-(N-vinylbenzylaminoethyl)-gamma-aminopropyltrimethoxysilane hydrochloride. Its rubber properties were similarly measured, and these results are also reported in Table 3.

TABLE 3

| ITEM | PRESENT INVENTION | COMPARISON EXAMPLE |
|---|---|---|
| Before thermal aging | | |
| Tensile strength, kg/cm$^2$ | 80 | 82 |
| Elongation, % | 350 | 360 |
| Hardness (JIS), JIS A | 65 | 65 |
| After thermal aging | | |
| Tensile strength, kg/cm$^2$ | 60 | 44 |
| Elongation, % | 262 | 187 |
| Tensile strength retention, % | 75 | 54 |
| Elongation retention, % | 75 | 52 |

EFFECTS OF THE INVENTION

The vulcanizable ethylene-propylene rubber composition of the present invention, because it contains in particular the alkoxysilane or hydrochloride thereof, component (B), as an agent which improves the heat resistance, characteristically can be heat-cured to afford a rubber which has excellent mechanical properties, excellent electrical insulation properties, and an excellent resistance to thermal aging.

That which is claimed is:
1. A vulcanizable rubber composition comprising (A) 100 parts by weight ethylene-propylene rubber,
(B) 0.2 to 2 parts by weight of an alkoxysilane with the general formula

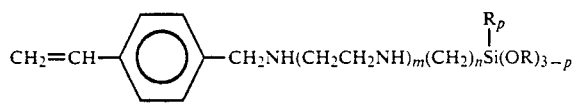

in the formula, m is zero or 1, n is 1 to 4, p is zero or 1, and R is a lower alkyl group, or hydrochloride of the alkoxysilane,
(C) 20 to 100 parts by weight reinforcing filler, and
(D) 0.5 to 10 parts by weight vulcanizing agent for the vulcanization of component (A).

2. The vulcanizable rubber composition as described in claim 1, further comprising from 5 to 50 parts by weight of vinyl group-containing organopolysiloxane gum as a component (E).

3. The vulcanizable rubber composition as described in claim 1 further comprising 0.5 to 5 parts by weight of a vulcanization assistant and 0.1 to 5 parts by weight of an aging inhibitor.

4. The vulcanizable rubber composition as described in claim 3 in which the ethylene-propylene rubber of (A) is an ethylene-propylene-diene copolymer, (B) is a hydrochloride of N-beta-(N-vinylbenzylaminoethyl)-gamma-aminopropyltrimethoxysilane, (C) is reinforcing silica, (D) is dicumyl peroxide, the vulcanization assistant is zinc oxide, and the aging inhibitor is 2-mercaptobenzimidazole.

5. The vulcanizable rubber composition as described in claim 3 in which the ethylene-propylene rubber of (A) is an ethylene-propylene copolymer, (B) is N-beta-(N-vinylbenzylaminoethyl)-gamma-aminopropyltrimethoxysilane, (C) is reinforcing silica, (D) is dicumyl peroxide, the vulcanization assistant is zinc oxide, and the aging inhibitor is 2-mercaptobenzimidazole.

6. The vulcanizable rubber composition as described in claim 2 further comprising 0.5 to 5 parts by weight of a vulcanization assistant and 0.1 to 5 parts by weight of an aging inhibitor.

7. The vulcanizable rubber composition as described in claim 6 in which the ethylene-propylene rubber of (A) is an ethylene-propylene-diene copolymer, (B) is a hydrochloride of N-beta-(N-vinylbenzylaminoethyl)-gamma-aminopropyltrimethoxysilane, (C) is reinforcing silica, (D) is dicumyl peroxide, (E) is dimethylvinylsiloxy-terminated dimethylsiloxane-methylvinylsiloxane copolymer gum, the vulcanization assistant is zinc oxide, and the aging inhibitor is 2-mercaptobenzimidazole.

* * * * *